F. C. URSBRUCK.
TYPE WRITING MACHINE.
APPLICATION FILED AUG. 16, 1910.

1,052,429.

Patented Feb. 4, 1913.

Witnesses,
F. E. Alexander
Ralph E. Warfield

Inventor,
Frank C. Ursbruck
by D. C. Stickney
Attorney.

UNITED STATES PATENT OFFICE.

FRANK C. URSBRUCK, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,052,429.   Specification of Letters Patent.   Patented Feb. 4, 1913.

Application filed August 16, 1910. Serial No. 577,463.

*To all whom it may concern:*

Be it known that I, FRANK C. URSBRUCK, a citizen of the United States, residing in New York, in the county of New York and State of New York, have invented certain new and useful Improvements in Type-Writing Machines, of which the following is a specification.

This invention relates to means to release the platen from the line-space wheel in typewriting machines, whereby the platen may be turned independently of the line-space wheel.

According to the present improvements, a cone carried by one of the members, preferably the platen, fits in a cup carried by the other member, and by means of levers, the cone and cup are pressed together very powerfully. The levers preferably comprise three sets, engaging the cone at equi-distant points around its border; and each set preferably comprises a pair of levers which are compounded for increasing the pressure upon the cone. A cam-sleeve is shiftably mounted on the platen axle to engage the compound levers, which are pivoted to a mount that is fast on the axle, and cause them to exert a powerful pressure against the loose clutch member, to cause it to grip the fast clutch member. A dwell portion on the cam-sleeve locks the clutch in operative position. Provision is made for the regulation of the pressure exerted by the levers against the clutch, and for taking up wear and looseness in the joints.

Figure 1:
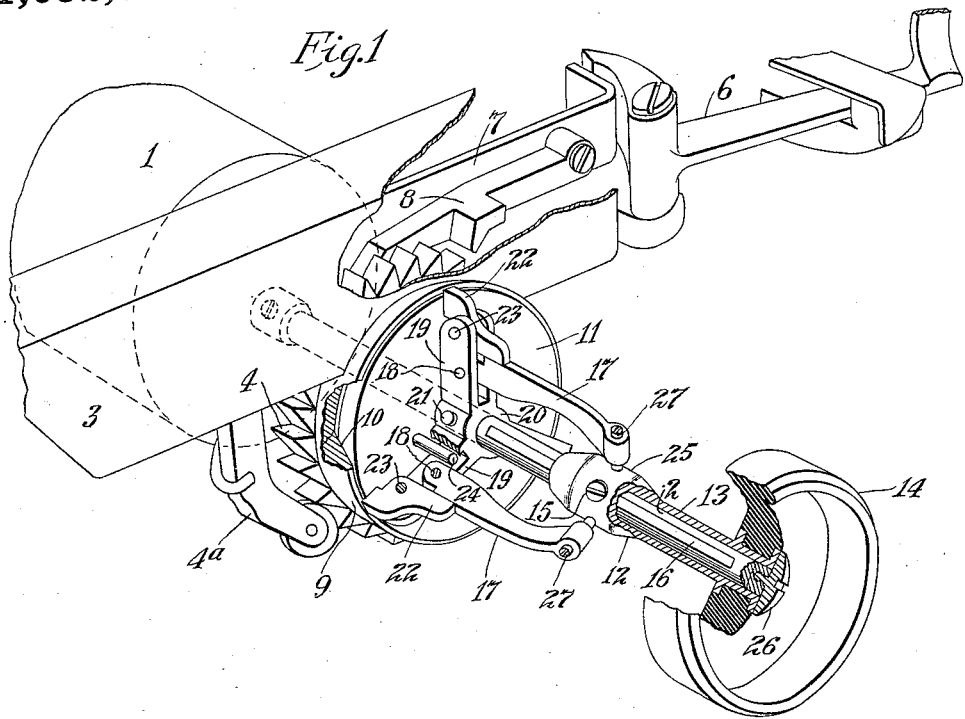
Figures 2, 3:
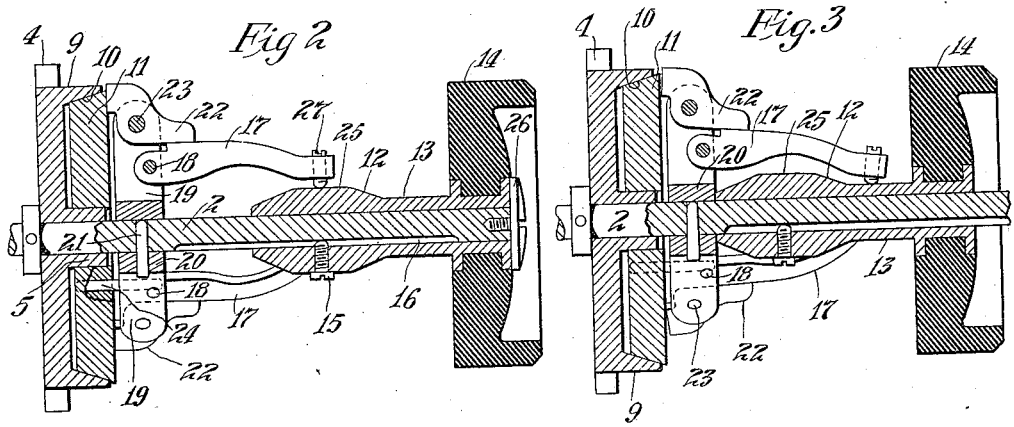

In the accompanying drawings, Figure 1 is a perspective of one embodiment of the invention, applied to the platen frame of an Underwood writing machine, and partly broken away. Fig. 2 is a sectional view, showing the clutch in use. Fig. 3 shows the clutch members disengaged.

A platen 1 is fast on an axle 2 journaled in the ends 3 of a platen frame. A line-space wheel 4 having a hub 5 is loosely mounted on the axle and is turned by a lever 6, through a slide 7 and pawl 8. A detent 4ª engages the line-space wheel. A conical friction clutch connects the line-space wheel and platen, the wheel having a drum or cup 9, the inner periphery of which is coned or beveled as at 10, at an angle of about 17 degrees, to form the fast member of the clutch. A cone or co-acting clutch-member 11 is correspondingly coned or beveled and loosely connected to the axle 2. Preferably the loose clutch member 11 surrounds the hub 5 of the line-space wheel. The clutch is controlled by an annular beveled shoulder or cam 12 formed on a sleeve 13, sliding on the axle. The sleeve carries a finger wheel 14, by an axial movement of which sleeve 13 is shifted and the cam is operated. Said sleeve is splined on the axle, as by a screw 15 entering a groove 16, so that the finger wheel can ordinarily turn the axle and platen as well as operate the cam when required. By sliding the sleeve outwardly on the axle 2 from its Fig. 3 position to that shown in Fig. 2, the cam 12 enters between and forces apart the outer ends of several operating levers 17, which are circularly arranged about the axle, and are pivoted at their inner ends at 18 to the radiating arms 19 of a mount 20 fixed to the axle (as by a pin 21). Levers 17 are preferably three in number and equidistant. Such vibration of the levers 17 rocks bell-cranks or levers 22 which are short as compared to the operating levers, and are pivoted at 23 intermediate their ends to said radiating arms 19, with their outer ends overlying the inner ends of the operating levers and their inner arms (which are shorter than arms 22) abutting the outer face of the loose clutch member or cone 11, to force it against the fast clutch member or cup 9, 10 on the line-space wheel. A pin 24 carried by the mount 11 loosely engages the mount 19, 20 to prevent independent rotation of the cone. Each of the levers constitutes a compound lever 17, 22, where a comparatively slight pressure upon the series of longer arms 17 will result in the exercise of considerable pressure by the arm 22 against the cone 11. Three compound levers are shown, each comprising a lever 17 and a lever 22. The three compound levers form a set or series.

The cam 12 has a dwell portion 25, which is introduced between the outer ends of the cam levers to hold them expanded, to lock the platen and line-space wheel together. A stop or button 26 on the axle 2 arrests the cam when the dwell portion has been brought into contact with the levers 17. This button 26 normally projects to the right from the center of knob 14, so that it may serve as a support for the thumb of the operator, while his fingers hook around the knob 14 to draw the latter to the right at Fig. 2, to release the platen. The arms 17 of the compound levers 17, 22 carry screws 27 which are engaged by the cam, and serve as adjustment mechanism to regulate the pressure of the cone against the cup, and also to enable wear of the parts to be taken up.

Having thus described my invention, I claim:

1. In a typewriting machine, the combination with a line-space wheel and a platen rotatable relatively thereto, of a conical friction clutch comprising a cup member and a cone member, sets of compound levers to force one clutch member axially of the platen against the other clutch member to connect the platen and line-space wheel, a cam to operate the levers, and a head upon which are pivoted all of said compound levers.

2. In a typewriting machine, the combination with a line-space wheel and a platen and platen axle rotatable relatively thereto, of a clutch mechanism including a clutch member fixed to the line-space wheel, a co-acting, axially movable clutch member, a mount fast on the axle, a device on the movable clutch member to prevent independent rotation of the mount and movable clutch member, a lever pivoted intermediate its ends to the mount, one end of said lever resting against the movable clutch member, a cam sliding on the axle, and an interposed lever pivoted to the mount and operated by the cam to rock the first lever and effect the operation of the clutch mechanism.

3. In a typewriting machine, the combination with a line-space wheel, and a platen and platen axle rotatable relatively thereto, of a clutch mechanism to connect the platen and line-space wheel, including a clutch member fixed to the line-space wheel, a movable co-acting clutch member, a mount fast with the platen, a connection between the mount and movable clutch member to prevent independent rotation, several compound levers spaced apart from each other and supported on the mount, and a cam to rock the compound levers to effect the operation of the clutch mechanism.

4. In a typewriting machine, the combination with a line-space wheel, and a platen and platen axle rotatable relatively thereto, of a clutch mechanism to connect the platen and line-space wheel, including a clutch member fixed to the line-space wheel, a movable co-acting clutch member, a mount fast with the platen, a device on the movable clutch member connecting the latter with the mount to prevent independent rotation, a compound lever supported on the mount, and means to rock the compound lever to close the clutch mechanism.

5. In a typewriting machine, the combination with a line-space wheel, and a platen and platen axle rotatable relatively thereto, of a clutch mechanism to connect the platen and line-space wheel, including a clutch member fixed to the line-space wheel, a movable co-acting clutch member, a mount fast with the platen, a device on the movable clutch member connecting the latter with the mount to prevent independent rotation, a compound lever supported on the mount, a cam to rock the compound lever to close the clutch mechanism, and adjusting mechanism interposed between the compound lever and the cam.

6. In a typewriting machine, the combination with a line-space wheel, and a platen and platen axle rotatable relatively thereto, of a clutch mechanism to connect the platen and line-space wheel, including movable and fast clutch members connected to the platen and line-space wheel, respectively, a mount fast with the platen, a lever pivoted on the mount to close the clutch mechanism, an operating lever also pivoted on the mount to rock the first lever, and a shiftable cam to rock the operating lever to effect the closure of the clutch mechanism.

7. In a typewriting machine, the combination with a line-space wheel, and a platen and platen axle rotatable relatively thereto, of a clutch mechanism to connect the platen and line-space wheel, including cone and cup members connected to the platen and line-space wheel, a head, a set of compound levers all pivoted to said head to move one of said clutch members along the platen axle to engage the other thereof, a shiftable cam to rock the compound levers to close the clutch, and a dwell portion on the cam to maintain the clutch closed.

8. In a typewriting machine, the combination with a line-space wheel, and a platen and platen axle rotatable relatively thereto, of a clutch mechanism to connect the platen and line-space wheel, including cone and cup members connected to the platen and line-space wheel, a head, a cam shiftable on the platen axle, and a set of compound levers interposed between the cam and the loose clutch member and mounted on said head and comprising an angle lever or bell-crank to drive the loose clutch member along the platen axle into engagement with the fast clutch member, and also comprising levers to rock the clutch levers when vibrated by the cam.

9. In a typewriting machine, the combination with a line-space wheel, and a platen and platen axle rotatable relatively thereto, of a clutch mechanism to connect the line-space wheel and platen, including a clutch member fixed to the line-space wheel, a movable co-acting clutch member, a system of compound levers fast with the platen, a device connecting the compound levers and movable clutch member to prevent independent rotation, and means to operate the levers to close the clutch.

10. In a typewriting machine, the combination with a line-space wheel, and a platen and platen axle, rotatable relatively thereto, of a clutch mechanism to connect the line-space wheel and platen, a mount fixed to the platen axle, a lever pivoted to the mount, an operating lever also pivoted to the mount in a vertical plane parallel to the pivotal point of the first lever, and in contact with one end of the first lever, and means to vibrate said operating lever to close the clutch mechanism.

11. In a typewriting machine, the combination with a line-space wheel and a platen and platen axle rotatable relatively thereto, of a clutch mechanism to connect the line-space wheel and platen, comprising a clutch member fixed to the line-space wheel, a cooperating movable clutch member to engage and disengage with said fast clutch member, a mount fixed to the platen axle, a loose connection between the mount and the movable clutch member to prevent independent rotation, levers circularly arranged about the axle and pivoted intermediate their ends to the mount, the inner ends of said levers in contact with the movable clutch member, similarly arranged operating levers, each pivoted at one end to the mount and engaging the outer ends of the first-mentioned levers, a sleeve splined on the axle and having a cam to force the free ends of the operating levers apart to rock the first-mentioned levers and force the movable clutch member against the fast clutch member, adjusting means on the operating levers bearing against the cam, a finger wheel on the sleeve, and a stop on the axle to arrest the sleeve.

12. In a typewriting machine, the combination with a line-space wheel and a platen and its axle rotatable relatively thereto, of a clutch mechanism to connect the platen and line-space wheel, including fast and movable clutch members, levers to force the movable clutch member into operative engagement with the fast clutch member, a cam sleeve on the axle to crowd the levers apart to effect the operative engagement of the clutch members, a finger wheel on the sleeve, and a button affording a rest when the cam sleeve is disengaged from the levers.

13. The combination with a platen, platen axle and a line-space wheel, of cone and cup members to clutch the platen to the line space wheel, one of said cone and cup members movable axially of the platen to engage the other of said members, a set of levers to operate said movable member, said levers including arms extending along the platen axle, and a manually operable cam device movable along the platen axle to engage said arms to press the cone and cup together.

14. The combination with a platen, platen axle and a line-space wheel, of cone and cup members to clutch the platen to the line space wheel, one of said cone and cup members movable axially of the platen to engage the other of said members, a set of levers to operate said movable member, said levers including arms extending along the platen axle, a manually operable cam device movable along the platen axle to engage said arms to press the cone and cup together, and a head mounted upon the platen axle upon which said levers are pivoted, and said levers including a plurality of compound levers, each including two leverage-increasing levers pivoted upon said head.

15. The combination with a platen, platen axle and a line-space wheel, of cone and cup members to clutch the platen to the line space wheel, one of said cone and cup members movable axially of the platen to engage the other of said members, a set of levers to operate said movable member, said levers including arms extending along the platen axle, a manually operable cam device movable along the platen axle to engage said arms to press the cone and cup together, and a head mounted upon the platen axle upon which said levers are pivoted, and said levers including a plurality of compound levers, each including two leverage-increasing levers pivoted upon said head; one of said leverage-increasing levers being in the form of a bell-crank having one arm extending along the platen axle and the other arm to bear upon said movable clutch member.

16. The combination with a platen, platen axle and a line-space wheel, of cone and cup members to clutch the platen to the line-space wheel, one of said cone and cup members movable axially of the platen to engage the other of said members, levers to operate said movable member, said levers including arms extending along the platen axle, and a manually operable cam device movable along the platen axle to engage said arms to press the cone and cup together; a dwell portion being provided upon said cam device to maintain the clutch closed.

FRANK C. URSBRUCK.

Witnesses:
K. FRANKFORT,
B. GOLDBERG.

Copies of this patent may be obtained for five cents each, by addressing the "Commissioner of Patents, Washington, D. C."